United States Patent [19]

Fennhoff et al.

[11] Patent Number: 5,612,398
[45] Date of Patent: Mar. 18, 1997

[54] RADIATION-RESISTANT POLYCARBONATES

[75] Inventors: Gerhard Fennhoff, Willich; Ralf Hufen, Duisburg; Klaus Kircher, Leverkusen; Wolfgang Ebert, Krefeld, all of Germany

[73] Assignee: Bayer AG, Leverkusen, Germany

[21] Appl. No.: 371,993

[22] Filed: Jan. 12, 1995

[30] Foreign Application Priority Data

Jan. 24, 1994 [DE] Germany ............ 44 01 928.9
Nov. 4, 1994 [DE] Germany ............ 44 39 333.4

[51] Int. Cl.$^6$ .................. C08K 5/43; C08G 64/00
[52] U.S. Cl. .................. 524/169; 523/136; 523/137; 524/157; 524/168; 524/611; 528/196; 528/373; 528/487
[58] Field of Search .................. 524/157, 168, 524/169, 611; 528/196, 373, 487; 523/136, 137

[56] References Cited

U.S. PATENT DOCUMENTS

| 4,218,357 | 8/1980 | Mark et al. | 524/167 |
| 5,102,934 | 4/1992 | Gatto | 524/169 |
| 5,214,078 | 5/1993 | Powell et al. | 523/136 |
| 5,274,009 | 12/1993 | Grigo et al. | 523/137 |

FOREIGN PATENT DOCUMENTS 0535464  4/1993  European Pat. Off. .

OTHER PUBLICATIONS

Orbit Abstract of EP–A–0 535 464 (Apr. 1993).

*Primary Examiner*—Terressa Mosley
*Attorney, Agent, or Firm*—Connolly & Hutz

[57] ABSTRACT

The present invention provides polycarbonates stabilized against γ-radiation and their use for the production of medical equipment.

4 Claims, No Drawings

RADIATION-RESISTANT POLYCARBONATES

The present invention provides thermoplastic aromatic polycarbonates based on diphenols of the formula (I)

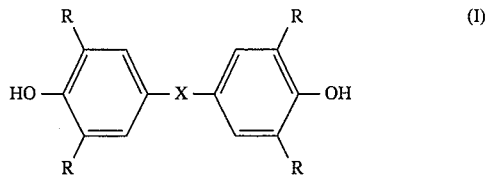

wherein

X is a single bond, $C_1$–$C_5$ alkylene, $C_2$–$C_5$ alkylidene, $C_5$–$C_6$ cycloalkylene, $C_5$–$C_{12}$ cycloalkylidene, —S—, —O—,

—$SO_2$—, —SO— or a residue of the formula

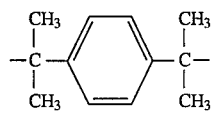

and

R is H and/or $C_1$–$C_3$ alkyl with a content of sulphonamides of the formula (II)

wherein $R^1$ is a $C_1$–$C_8$ alkyl, $C_5$–$C_6$ cycloalkyl or a $C_6$–$C_{10}$ aryl residue, $R^2$ and $R^3$ are the same or different and are H, a $C_1$–$C_8$ alkyl, phenyl or a $C_5$–$C_6$ cycloalkyl, in amounts of from 0.001 wt. % to 5 wt. %, preferably from 0.005 wt. % to 1 wt. % and in particular from 0.01 wt. % to 0.8 wt. %, in each case based on 100 wt. % of aromatic polycarbonate and optionally with a content of aliphatic or cycloaliphatic mono- or polyalcohols or derivatives thereof in amounts from 0.001 to 2 wt. %, preferably from 0.001 wt. % to 1.5 wt. %, again based in each case on 100 wt. % of aromatic polycarbonate.

The polycarbonates according to the invention are stabilized against γ-radiation by the additives and are thus suitable in various ways for medical applications, in particular for producing equipment or equipment parts which can be sterilized by ionizing radiation before or after use without excessive yellowing of the equipment taking place.

The present invention thus also provides the use of the polycarbonates stabilized according to the invention for producing medical equipment or parts of medical equipment.

Thermoplastic aromatic polycarbonates within the scope of the present invention comprise both homopolycarbonates and copolycarbonates; the polycarbonates may be linear or branched in a known manner.

Some, up to 80 mol %, preferably from 20 mol % to 50 mol %, of the carbonate groups in the polycarbonates suitable according to the invention may be replaced by aromatic dicarboxylic acid ester groups. Polycarbonates of this kind, which contain both acid residues of carbonic acid and acid residues of aromatic dicarboxylic acids incorporated in the molecular chain are, accurately designated, aromatic polyester carbonates. For the sake of simplicity, in the present application they are subsumed under the heading of thermoplastic aromatic polycarbonates.

Polycarbonates to be stabilized according to the invention are produced in a known manner from diphenols, carbonic acid derivatives, optionally chain terminators and optionally branching units, a portion of the carbonic acid derivatives being replaced by aromatic dicarboxylic acids or derivatives of aromatic dicarboxylic acids for the production of the polyester carbonates—specifically by aromatic dicarboxylic acid ester structural units determined by the carbonate structural units to be replaced in the aromatic polycarbonates.

Details of the production of polycarbonates have been specified in hundreds of patent specifications for approximately 40 years. By way of example, reference is only made here to "Schnell" Chemistry and Physics of Polycarbonates", Polymer Reviews, Volume 9, Interscience Publishers, New York, London, Sydney 1964, to D. C. PREVORSEK, B. T. DEBONA and Y. KESTEN, Corporate Research Center, Allied Chemical Corporation, Morristown, N.J. 07960, "Synthesis of Poly(ester Carbonate) Copolymers" in Journal of Polymer Science, Polymer Chemistry Edition, Vol 18, 75–90 (1980), to D. Freitag, U. Grigo, P. R. Müller, H. Nonvertue, BAYER AG, "Polycarbonates" in Encyclopedia of Polymer Science and Engineering, Volume 11, Second Edition, 1988, pages 648–718 and finally to Dres. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag München, Vienna 1992, pages 117–299.

The thermoplastic polycarbonates, including thermoplastic aromatic polyester carbonates have mean molecular weights $M_W$ (determined by measurement of the relative viscosity at 25° C. in $CH_2Cl_2$ and a concentration of 0.5 g per 100 ml of $CH_2Cl_2$) of from 12 000 to 120 000, preferably from 18 000 to 80 000 and in particular from 22 000 to 60 000.

Diphenols suitable for the production of the polycarbonates to be stabilized according to the invention are, for example, hydroquinone, resorcinol, dihydroxydiphenyls, bis(hydroxyphenyl)alkanes, bis(hydroxyphenyl) cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl) sulphoxides, α,α'-bis(hydroxyphenyl) diisopropylbenzenes, and ring-alkylated compounds thereof.

Preferred diphenols are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)-p-diisopropylbenzene, and 1,1-bis(4-hydroxyphenyl)-3,3,5-trimethylcyclohexane.

Particularly preferred diphenols are 2,2-bis(4-hydroxyphenyl)propane, 1,1-bis(4-hydroxyphenyl) cyclohexane and 1,1-bis(4-hydroxyphenyl)-3,3,5-trimethylcyclohexane.

These and other suitable diphenols are described, for example, in U.S. Pat. Nos. 3,028,635, 2,999,835, 3,148,172, 2,991,273, 3,271,367, 4,982,014 and 2,999,846, in German laid-open patent applications 1 570 703, 2 063 050, 2 036 052, 2 211 956 and 3 832 396, in the French Patent 1 561 518, in the monograph "H. Schnell, Chemistry and Physics of Polycarbonates, Interscience Publishers, New York 1964" and in the Japanese laid-open patent applications 62039/1986, 62040/1986 and 105550/1986.

In the case of homopolycarbonates, only one diphenol is used, in the case of copolycarbonates, a plurality of diphenols are used.

Suitable chain terminators are both monophenols and monocarboxylic acids. Suitable monophenols are phenol itself, alkylphenols such as cresols, p-tert. butylphenol, p-n-octylphenol, p-iso-octylphenol, p-n-nonylphenol and p-iso-nonylphenol.

Suitable monocarboxylic acids are benzoic acid and alkylbenzoic acids.

Preferred chain terminators are phenols of the formula (III)

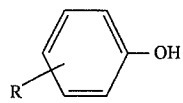

wherein
R is a branched or unbranched $C_8$- and/or $C_9$-alkyl residue.

The amount of chain terminator to be used is 0.5 mol % to 10 mol %, based on moles of the diphenols respectively used. The chain terminator may be added before, during or after the phosgenation.

Suitable branching units are the tri- or higher functional compounds known in polycarbonate chemistry, in particular those with three or more than three phenolic OH groups.

Suitable branching units are, for example, phloroglucinol, 4,6-dimethyl-2,4,6-tris(4-hydroxyphenyl)hepten-2, 4,6-dimethyl-2,4,6-tris(4-hydroxyphenyl)heptane, 1,3,5-tris(4-hydroxyphenyl)benzene, 1,1,1 -tris(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6 bis(2-hydroxy-5'-methylbenzyl)-4-methylphenol, 2-(4-hydroxyphenyl)-2-(2,4-dihydroxyphenyl)propane, hexa(4(4-hydroxyphenylisopropyl)phenyl)orthoterephalate, tetra(4-hydroxyphenyl)methane, tetra(4-(4-hydroxyphenylisopropyl)phenoxy)methane and 1,4-bis(4', 4"-dihydroxytriphenyl)methyl)benzene and 2,4-dihydroxybenzoic acid, trimesic acid, cyanuric chloride and 3,3-bis(3-methyl-4-hydroxyphenyl)-2-oxo-2,3-dihydroindol.

The amount of the branching units to be optionally used is 0.05 mol % to 2 mol %, again based on moles of the respective diphenols used.

The branching units may be either initially charged together with the diphenols and the chain terminators in the aqueous alkaline phase, or be added dissolved in an organic solvent, before the phosgenation.

All these measures for producing polycarbonates are known to the person skilled in the art.

Aromatic dicarboxylic acids suitable for producing polyester carbonates are, for example, orthophthalic acid, terephthalic acid, isophthalic acid, tert. butylisophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyletherdicarboxylic acid, 4,4'-diphenylsulphonedicarboxylic acid, 2,2-bis(4-carboxyphenyl)propane, trimethyl-3-phenylindane-4,5'-dicarboxylic acid.

Of the aromatic dicarboxylic acids, terephthalic acid and/or isophthalic acid are particularly preferably used. Derivatives of dicarboxylic acids are dicarboxylic acid dihalides and dicarboxylic acid dialkyl esters, in particular dicarboxylic acid dichlorides and dicarboxylic acid dimethyl esters.

The replacement of the carbonate groups by the aromatic dicarboxylic acid ester groups takes place substantially stoichiometrically and also quantitatively, so that the molar ratio of the coreactants is also reproduced in the final polyester carbonate. The aromatic dicarboxylic acid ester groups may be incorporated either randomly or in blocks.

Preferred methods of producing the polycarbonates to be stabilized according to the invention are the known interface method and the known melt transesterification process.

The carbonic acid derivative used is preferably phosgene in the first method, in the latter method preferably diphenylcarbonate.

Catalysts, solvents, working up, reaction conditions etc. are adequately described and known in both cases.

Preferred residues $R^1$, $R^2$ and $R^3$ of the formula (II) are phenyl, methyl, ethyl, propyl, isopropyl, n-butyl, t-butyl and cyclohexyl.

Suitable sulphonamides of the formula (II) are, for example, triphenylsulphonamide, N,N-diphenyl methyl sulphonamide, N-methyl N-phenyl phenylsulphonamide and N,N-dimethyl phenyl sulphonamide.

The aliphatic or cycloaliphatic mono- or polyalcohols suitable as additives are preferably $C_1$–$C_{20}$ monoalcohols, aliphatic $C_2$–$C_{20}$ dialcohols, aliphatic $C_3$–$C_{20}$ trialcohols and aliphatic $C_4$–$C_{20}$ tetraalcohols, cycloaliphatic $C_3$–$C_{12}$ monoalcohols and cycloaliphatic $C_3$–$C_{12}$ dialcohols.

These mono- and polyalcohols are known in the literature (see, for example, Houben-Weyl, "Methoden der organischen Chemie", Volume 6/1a/1 "Alkohole I", Band 6/1a/2, "Alkohole II" and Volume 6/1b, "Alkohole III" Georg Thieme Verlag Stuttgart-New York, 1979, 1980 and 1984).

Preferred monoalcohols are dodecanol, hexadecanol-(1), hexadecanol-(2), stearyl alcohol, octadecanol and eicosanol.

Preferred polyalcohols are diols, triols, tetraols, pentaols and hexaols, in particular diols of the formula (IV)

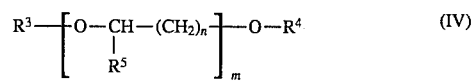

wherein $R^3=R^4=H$, $R^5=H$ or $C_1$–$C_4$ alkyl, n is an integer of from 1 to 36 and m is an integer of from 1 to 1500, preferably from 2 to 1200 and in particular from 3 to 1000.

Examples of this are ethylene glycol, 1,2-propane diol, 1,3-propane diol, 1,2-butane diol, 1,3-butane diol, 1,4-butane diol, 2,3-butane diol, 1,2-pentane diol, 1,5-pentane diol, 2,4-pentane diol, 1,2-hexane diol, 1,6-hexane diol, 3-methyl-1,5-pentane diol, 2,5-hexane diol, 1,2-cyclohexane diol, 1,4-cyclohexane diol, cyclohexyl-1,4-dimethanol, 2 -methyl-2,4-pentane diol, 1,8-octane diol, 1,10-decane diol, 1,2-undecane diol, 1,2-dodecane diol, 1,12-dodecane diol, 1,2-hexadecane diol, 1,2,5-pentane triol, 1,2,3-hexane triol, 1,2,6-hexane triol, 2-(hydroxymethyl)-2-methyl-1,3-propane diol and 2,3,4,5,6,7-octane hexaol.

Suitable derivatives of the mono- or polyalcohols suitable according to the invention are ethers, carboxylic acid esters, acetals, alkyl carbonates, epoxides, urethanes, phosphates, phosphonates, phosphites, phosphonites and siloxanes.

These derivatives are also known in the literature, or are obtainable by processes known in the literature (see the relevant volumes of Houben-Weyl, "Methoden der organischen Chemie", Georg Thieme Verlag).

Preferred derivatives are the ethers, carboxylic acid esters, acetals and alkyl carbonates of mono- or polyalcohols; examples of these are diethylene glycol, diethylene glycol diethyl ether, dipropylene glycol, tripropylene glycol, 1,3-diethoxy-2-propanol, 3,3'-oxibis(1,2-propane diol), 2,2'-oxibisbutane, the alkyl esters of undecanoic acid, dodecanoic acid, hexadecanoic acid, stearic acid and dodecanoic acid, glycerine monostearate, glycerine distearate, glycerine tristearate, 1,1-bis(2,3-dioctadecanyloxypropyloxy-)hexadecane, 2,2-dicyclohexyloxypropane, acetoxy(4-(2-tetrahydropyranyloxy)pentyloxy)methane, acetoxydodecyloxymethane, acetoxy(3-(2-methyl-1,3-dioxolan-2-yl)-propyloxy) methane, ethylene carbonate, dimethyl carbonate, diethyl carbonate, dipropyl carbonate, diisopropyl carbonate and dineopentylcarbonate.

Derivatives particularly preferred are those of the Formula (IV)

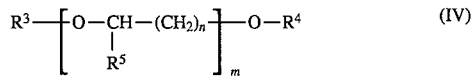

wherein
$R^3$ and $R^4$ may be the same or different, and may be $C_1$- to $C_{30}$-alkyl, either branched or unbranched, or acyl, silyl and/or pyranyl,
$R^5$ may be H or $C_1$- to $C_4$-alkyl,
n may be an integer from 1 to 36 and
m may be an integer from 1 to 1500, preferably from 2 to 1200 and in particular from 3 to 1000.

The compounds of the formula (IV) may preferably have molecular weights of between 106 g/mol and 100 000 g/mol, particularly preferably between 150 g/mol and 12 000 g/mol, very particularly preferably between 500 g/mol and 10 000 g/mol.

The sulphonamides to be used according to the invention and optionally the mono- or polyalcohols, or derivatives thereof, to be optionally used may be incorporated into the polycarbonates either simultaneously or successively at temperatures between 260° and 380° C. via the melts of the polycarbonates or via the solution of the polycarbonates in known solvents, such as $CH_2Cl_2$ and/or chlorobenzene and subsequent evaporation of the solvent in a known manner.

The present invention thus also provides a method for producing polycarbonates stabilized according to the invention which is characterized in that sulphonamides of the formula (II)

wherein
$R^1$ is a $C_1$–$C_8$-alkyl, $C_5$–$C_6$-cycloalkyl or a $C_6$–$C_{10}$-aryl residue,
$R^2$ and $R^3$ are the same or different, and are H, a $C_1$–$C_{18}$-alkyl, phenyl or a $C_5$–$C_6$-cycloalkyl,
and optionally the aliphatic or cycloaliphatic mono- or polyalcohols or derivatives thereof are mixed with polycarbonates at temperatures between 260° and 380° C. in the mixing devices conventional for this, for example kneaders or extruders, or in that the sulphonamides of the formula (II) and optionally the aliphatic or cycloaliphatic mono- or polyalcohols or derivatives thereof are dissolved together with polycarbonate in the known solvents, such as $CH_2Cl_2$ and/or chlorobenzene and the mixtures thus obtained, of sulphonamides of the formula (II) and optionally aliphatic or cycloaliphatic mono- or polyalcohols or derivatives thereof, with the polycarbonates are isolated by subsequent evaporation of the solvent in a known manner.

Suitable equipment for producing the polycarbonates stabilized according to the invention are, in the case in which incorporation is carried out via the polycarbonate melt, kneaders or extruders, in the case in which incorporation is carried out via the polycarbonate solution, boilers having mixing or stirring devices.

The irradiation of polycarbonate mouldings by means of ionizing radiation, such as γ-radiation or electron radiation is carried out in order to sterilize articles such as dialyzers for blood dialysis, disposable syringes etc. before their medical use. In the process, irreversible damage, for example in the form of yellowing of the polycondensate, always occurs. In order to reduce or avoid this damage, the polycondensates have to be stabilized before irradiation.

According to U.S. Pat. No. 4,007,150 and U.S. Pat. No. 4,041,003, it is known to add perfluoroalkanesulphonamides to polycarbonates as demoulding aid.

According to U.S. Pat. No. 4,477,637, it is known to add sulphonamides to special alkylated polycarbonates. The sulphonamides act as flame retardants.

Polycarbonates with sulphonanilide end groups are known according to U.S. Pat. No. 4,471,104. These polycarbonates are distinguished by improved flame resistance.

Polycarbonates with N-alkyl perfluoroalkylsulphonamide end groups which have improved processability are known according to U.S. Pat. No. 4,503,213.

Flame-resistant polycarbonates with co-condensed bissulphonylamide structural units are known according to EP-O 0 071 125.

Colour-stable polycarbonates are known according to U.S. Pat. No. 4,880,855, which contain as additives, inter alia, thiols, thioethers, cyclic thioethers and sulphones.

The sulphonamides to be added according to the invention, however, have the technical advantage of remaining stable at high processing temperatures and producing no yellowing due to processing, with, at the same time, an outstanding colour-stabilizing effect with respect to ionizing radiation.

According to U.S. Pat. No. 5,214,078, radiation-resistant polycarbonates are known which contain polyetherpolyols and aromatic disulphides. The sulphonamides to be added according to the invention, by contrast, have, by virtue of their considerably higher thermal stability, a significantly greater processing range as regards the height of the processing temperature and the colour stability in the melt in the event of machine stoppages during injection moulding. As a result, only a very small amount of reject material is produced on start up of the respective injection moulding machine after standstill in the melt.

Radiation-resistant polycarbonates are also known according to EP-A-0 572 889, which contain a multiplicity of sulphur compounds and optionally alcohols or derivatives thereof as stabilizers. The sulphonamides to be added according to the invention have the same advantages with respect to these as with respect to the aromatic disulphides described according to U.S. Pat. No. 5,214,078.

The polycarbonates stabilized according to the invention are neither previously described nor made obvious by this prior art.

Rather, it was surprising that the compounds of the formula (II), in particular in combination with mono- or polyalcohols or with derivatives thereof have an exceptional stabilizing effect on polycarbonates or on polyester carbonates against the effect of γ-radiation, so that they cause yellowing of the particular polycondensate to be stabilized to a significantly less extent than the already known stabilizer systems of the current prior art, which fact can be demonstrated by determining the difference in the Yellowness Index of the polycondensate mixture according to the invention after and before γ irradiation.

The polycarbonates stabilized against γ-radiation according to the invention may also contain conventional additives such as thermal stabilizers, UV absorbers, flow modifiers, demoulding aids, plasticizers, antistatic agents, flame retardants and/or colorants and, for special applications, also fillers such as glass fibres or glass beads. The additives are mixed in in the amounts conventional for polycarbonates, under conventional conditions and on conventional machines. They may be mixed in before, during or after the stabilization according to the invention by the sulfonamides and optionally alcohols or derivatives thereof.

The processing of the polycarbonates stabilized according to the invention into mouldings of any kind, in particular medical equipment, is carried out on known injection moulding machines and extrusion machines.

The mouldings made of polycarbonates stabilized according to the invention may, apart from in medicine, also be used in applications involving food contact, that is to say as packaging materials of any kind and in all other fields of application conventional for polycarbonates.

EXAMPLES

The relative solution viscosities ($\eta$rel) of the polycondensates were determined at 25° C. For this purpose, 0.500 g of the respective condensate was dissolved in 100 ml of dichloromethane.

Production of the polycarbonate mixtures with the stabilizers

The examples of mixtures of polycarbonates with different stabilizers for $\gamma$ radiation given in the following table were produced on a twin-screw extruder at 300° C. melt temperature. Colour sample disks (size: 60 mm×40 mm×4 mm) were produced at 300° C. and 320° C. processing temperature. These were sterilized with 3 Mrad of $\gamma$-radiation.

The compositions of the mixtures and the experimental findings are summarized in the following table.

| | | | Results | | |
|---|---|---|---|---|---|
| Example | Additive | Amount of additive in wt. % | Y.I. after 300° processing temperature | Y.I. after 320° processing temperature | $\Delta$Y.I. (product of 320° C. processing |
| 1: PC+ additive | N,N-dimethyl (4-methyl-phenyl)-sulphonamide | 0.5 | 4.0 | 4.1 | 11.3 |
| | PPG | 0.75 | | | |
| 2: PC+ additive | N-methyl-benzol-sulphon-amide | 0.5 | 3.9 | 4.1 | 10.7 |
| | PPG | 0.75 | | | |
| comparison 1: PC (reextruded) | — | — | 6.1 | 6.9 | 22.1 |
| 2: PC+ additive | PPG | 0.75 | 4.0 | 4.1 | 13.2 |
| 3: PC+ additive | diocta-decyldi-sulphide | 0.5 | 6.5 | 9.0 | 5.0 |
| | PPG | 0.75 | | | |

Y.I. Yellowness Index /$\Delta$Y.I. = Y.I. 10 days after $\gamma$ irradiation – Y.I. before $\gamma$ irradiation
PC = polycarbonate from bisphenol A and bisphenol A dichlorocarbonate, with a relative solution viscosity of 1.292.
PPG = polypropylene glycol (with a molecular weight of 2000 g/mol)

We claim:
1. Mixtures of thermoplastic aromatic polycarbonates based on diphenols of the formula (I)

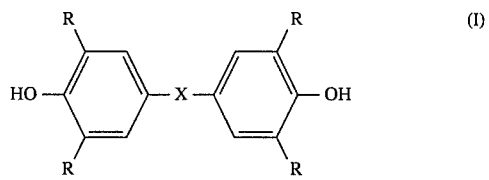

wherein

X is a single bond, $C_1$–$C_5$ alkylene, $C_2$–$C_5$ alkylidene, $C_5$–$C_6$ cycloalkylene, $C_5$–$C_{12}$ cycloalkylidene, —S—, —O—,

—$SO_2$—, —SO— or a residue of the formula

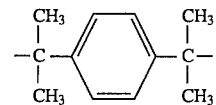

and

R is H and/or $C_1$–$C_3$ alkyl with sulphonamides of the formula (II)

wherein $R^1$ is a $C_1$–$C_8$ alkyl, $C_5$–$C_6$ cycloalkyl or a $C_6$–$C_{10}$ aryl residue, $R^2$ and $R^3$ are the same or different and are H, a $C_1$–$C_8$ alkyl, phenyl or a $C_5$–$C_6$ cycloalkyl, wherein said sulphonamides are present in amounts of from 0.001 wt. % to 5 wt. % based in each case on 100 wt. % of aromatic polycarbonate and with polyalcohols, wherein said polyalcohols are present in amounts of from 0.001 wt. % to 2 wt. %, based on 100 wt. % of aromatic polycarbonate, further wherein said polyalcohols are diols of the formula (IV)

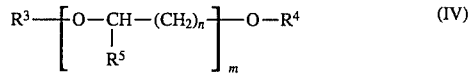

wherein $R^3$=$R^4$H, $R^5$=H or $C_1$–$C_4$ alkyl, n is an integer from 1 to 36 and m is an integer from 2 to 1200.

2. Mixtures of thermoplastic aromatic polycarbonates based on diphenols of the formula (I)

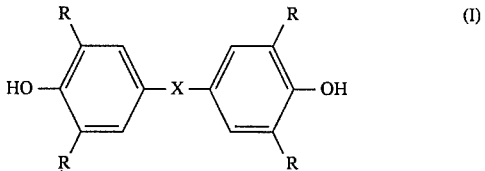

wherein

X is a single bond, $C_1$–$C_5$ alkylene, $C_2$–$C_5$ alkylidene, $C_5$–$C_6$ cycloalkylene, $C_5$–$C_{12}$ cycloalkylidene, —S—, —O—,

—SO$_2$—, —SO— or a residue of the formula

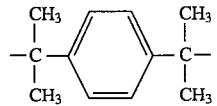

and

R is H and/or C$_1$–C$_3$ alkyl with sulphonamides of the formula (II)

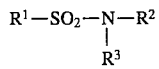

wherein

R$^1$ is a C$_1$–C$_8$ alkyl, C$_5$–C$_6$ cycloalkyl or a C$_6$–C$_{10}$ aryl residue, R$^2$ and R$^3$ are the same or different and are H, a C$_1$–C$_8$ alkyl, phenyl or a C$_5$–C$_6$ cycloalkyl, wherein said sulphonamides are present in amounts of from 0.001 wt. % to 5 wt. % based in each case on 100 wt. % of aromatic polycarbonate and with derivatives of polyalcohols, wherein said derivatives are present in amounts of from 0.001 wt. % to 2 wt. %, based on 100 wt. % of aromatic polycarbonate, further wherein said derivatives of polyalcohols are those of the formula (IV)

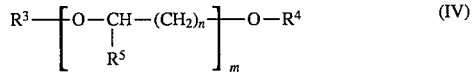

wherein R$^3$ and R$^4$ are the same or different and are C$_1$- to C$_{30}$-alkyl, acyl, silyl or pyranyl, R$^5$ is H or C$_1$- to C$_4$-alkyl, n is an integer from 1 to 36 and m is an integer from 2 to 1200.

3. Thermoplastic aromatic polycarbonates according to claim 1, wherein said polyalcohols are diols of the formula (IV) and m is an integer from 3 to 1000.

4. Thermoplastic aromatic polycarbonates according to claim 2, wherein said derivatives of polyalcohols are those of the formula (IV) and m is an integer from 3 to 1000.

\* \* \* \* \*

UNITED STATES PATENT AND TRADEMARK OFFICE
CERTIFICATE OF CORRECTION

PATENT NO.　：　5,612,398
DATED　　　：　March 18, 1997
INVENTOR(S)：　Fennhoff, et al

It is certified that error appears in the above-indentified patent and that said Letters Patent is hereby corrected as shown below:

In Column 8, line 52 (Claim 1), "$R^3=R^4H$" should be --$R^3=R^4=H$--.

Signed and Sealed this

Twenty-second Day of July, 1997

Attest:

BRUCE LEHMAN

Attesting Officer　　　Commissioner of Patents and Trademarks